United States Patent

Seymour

[11] Patent Number: 5,848,683
[45] Date of Patent: Dec. 15, 1998

[54] BUCKET CONVEYOR CHAIN

[76] Inventor: Timothy Harrison Seymour, 9544 Moran St., Biloxi, Miss. 39532

[21] Appl. No.: 688,400

[22] Filed: Jul. 30, 1996

[51] Int. Cl.$^6$ .................................................. B65G 17/36
[52] U.S. Cl. ........................................... 198/711; 198/712
[58] Field of Search ..................... 198/711, 712, 198/731, 835

[56] References Cited

U.S. PATENT DOCUMENTS

| | | | |
|---|---|---|---|
| 251,315 | 12/1881 | Stutz | 198/711 |
| 1,269,013 | 6/1918 | Smiley | 198/731 |
| 4,503,971 | 3/1985 | Lachmann | 198/711 |
| 4,552,220 | 11/1985 | Jones | 198/712 |
| 4,998,482 | 3/1991 | Kunczynski | 198/712 |
| 5,119,924 | 6/1992 | Kaminski | 198/835 |
| 5,199,771 | 4/1993 | James et al. | 198/731 |
| 5,236,079 | 8/1993 | Herold | 198/844.2 |
| 5,507,382 | 4/1996 | Hartwell et al. | 198/835 |

FOREIGN PATENT DOCUMENTS

| | | | |
|---|---|---|---|
| 224193 | 11/1924 | Australia | 198/711 |
| 51692 | 5/1982 | European Pat. Off. | 198/711 |
| 2600494 | 7/1977 | Germany | 198/712 |
| 3714976 | 12/1988 | Germany | 198/711 |
| 62-105808 | 5/1987 | Japan | 198/711 |
| 1562244 | 5/1990 | U.S.S.R. | 198/844.2 |
| 1239874 | 7/1971 | United Kingdom | 198/711 |

*Primary Examiner*—William E. Terrell
*Assistant Examiner*—Khoi H. Tran

[57] ABSTRACT

An improved bucket conveyor chain that uses a series of plate type lines 3 connected together at adjacent ends by a bars 5 and 9. Ropes 11 are connected to the bars 5 and 9 to protect the chain from breaking in half in case of damage. The bars 5 and 9 are sectionalized and overlapped thereby providing easier maintenance.

1 Claim, 2 Drawing Sheets

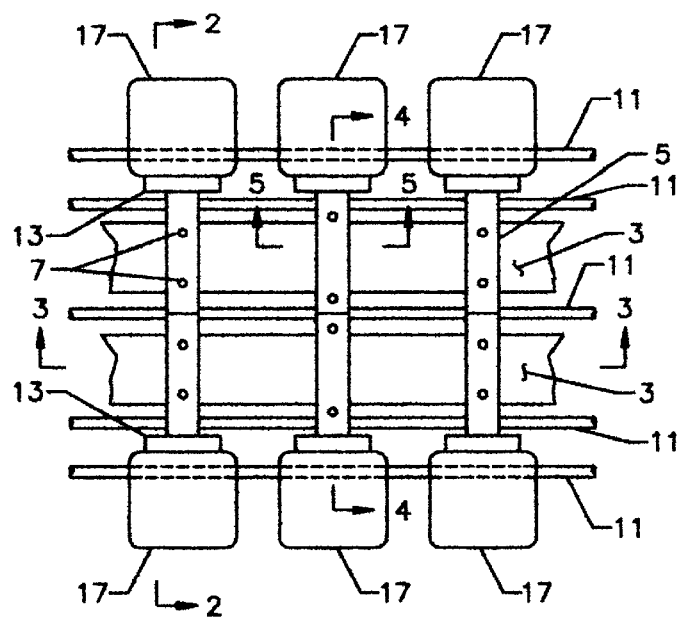
FIG. 1
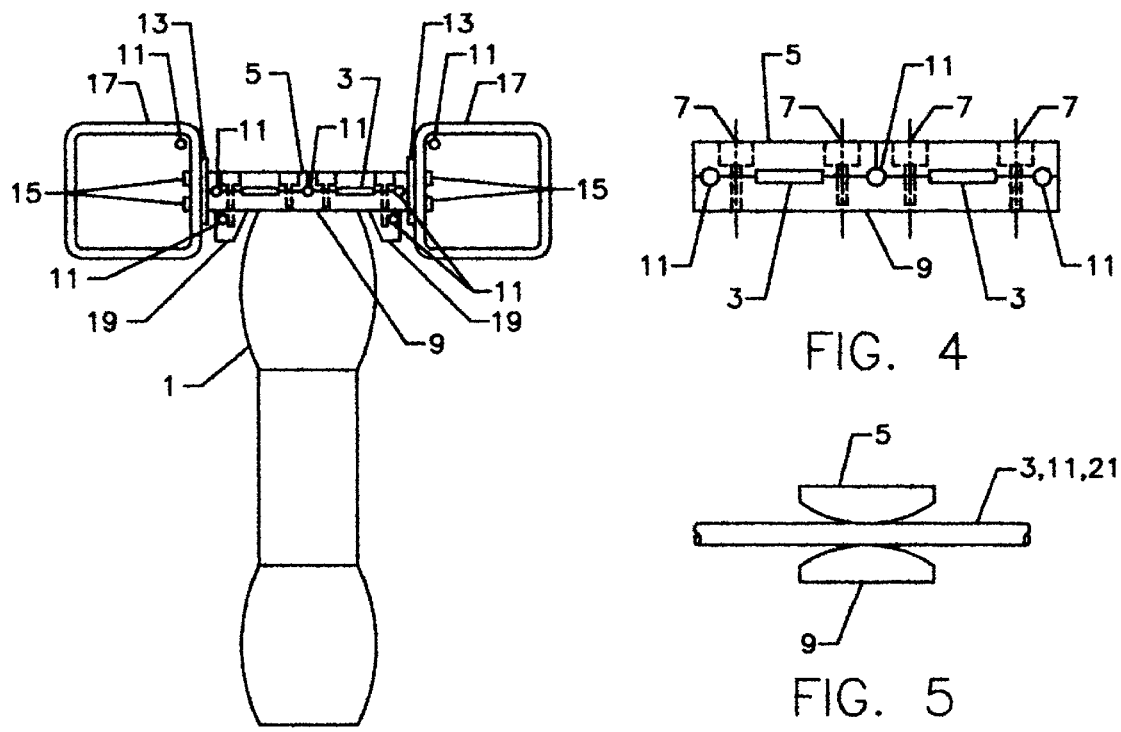
FIG. 2
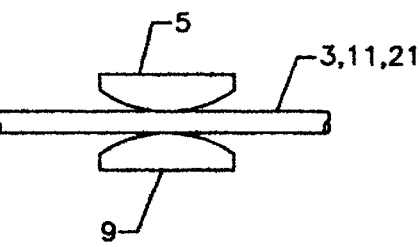
FIG. 4
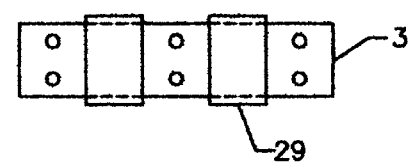
FIG. 5
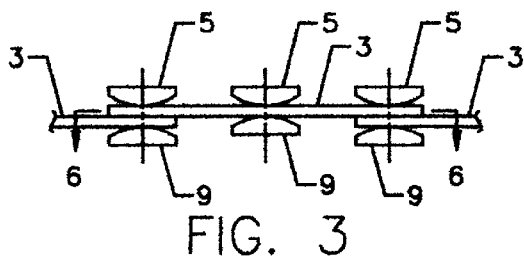
FIG. 3
FIG. 6

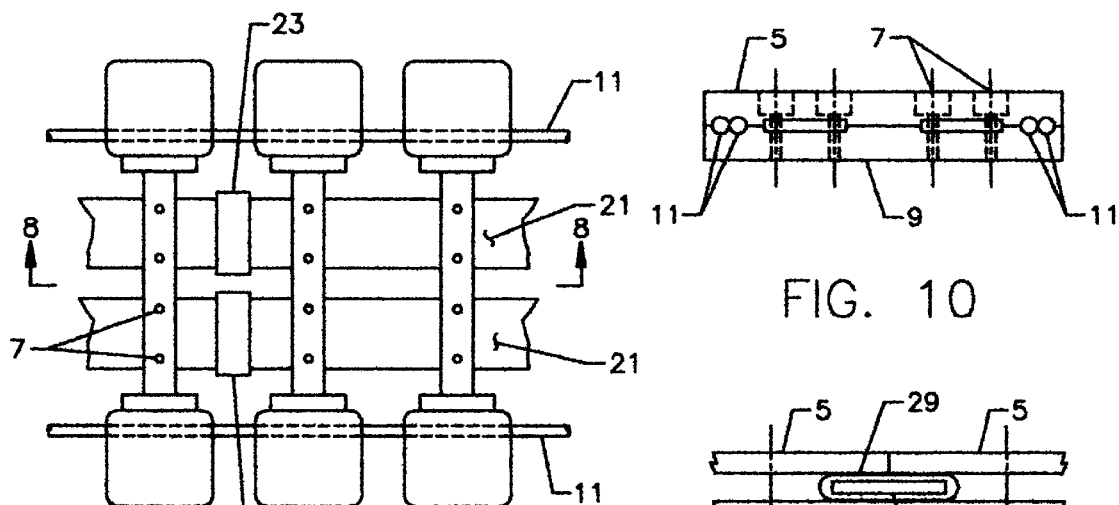
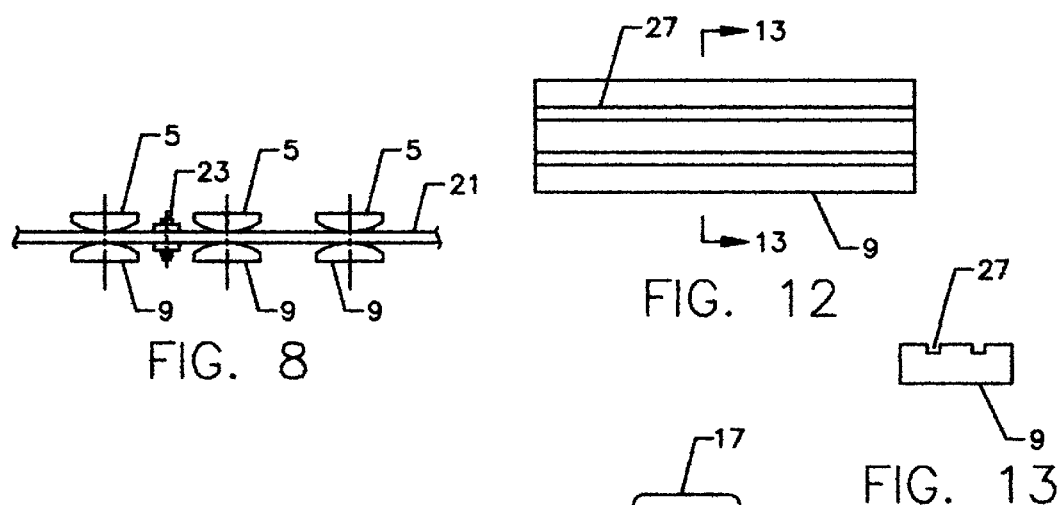
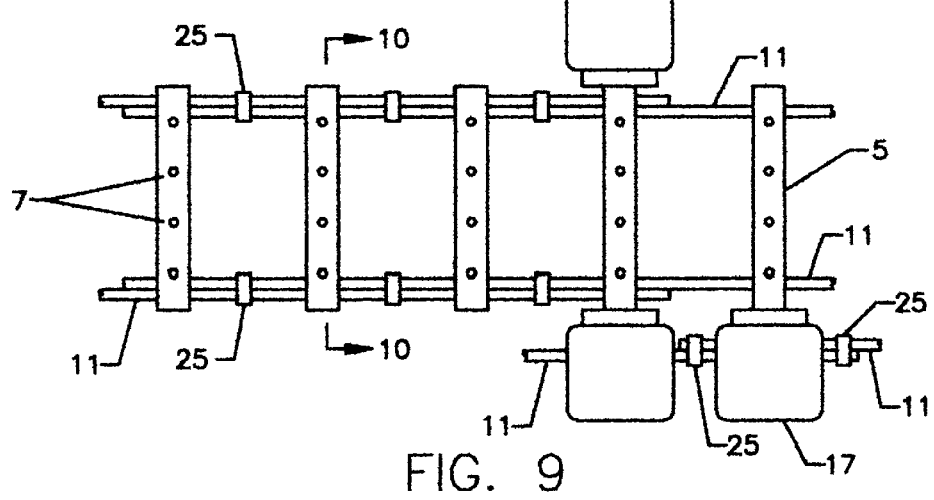

BUCKET CONVEYOR CHAIN

BACKGROUND

1. Field of Invention

This invention relates to a composite bucket conveyor comprised of endless bands or strands of ropes, belts, or link plates, arranged for high performance, safety, and easy maintenance.

2. Description of Prior Art

Past bucket conveyor chains can be grouped into two general groups, i.e., those in which the buckets are connected to axial tension elements comprised of rigid links that are hinged together such as roller chains and those in which the buckets are attached to long axial tension elements such as rubber belts, leather belts, wire ropes, or metal belts which are joined at their ends to form an endless belt. My U.S. Pat. No. 5,469,957 introduced a third type of conveyor chain comprised of a plurality of short link plates that are held together and bent about closely spaced bars as the chain is circulated about its pulleys or wheels. This present invention improves upon my U.S. Pat. No. 5,469,957.

OBJECTS AND ADVANTAGES

Accordingly I claim the following as my objects and advantages of this invention:

To introduce a way to maintain parts of the chain with less disassembly.

To introduce a way of attaching additional bars to add more buckets and enhance smoothness of operation.

To introduce a much improved bucket conveyor chain comprised of a series of link plates by adding ropes, belts, or other axial tension members to provide a safety to keep the chain from separating should the link plates break in half.

To introduce a way to reduce damage to the ropes, belts, and link plates as they bend back and forth.

To improve traction of the chain on its wheels or pulleys.

To introduce a method for reducing chordal action dynamics and stress on the ropes, belts, and link plates.

DRAWING FIGURES

FIG. 1 is a view of a bucket conveyor chain comprised of a combination of link plates and ropes.

FIG. 2 is a cross sectional view along line 2—2 of FIG. 1.

FIG. 3 is a cross sectional view along line 3—3 of FIG. 1.

FIG. 4 is a cross sectional view along line 4—4 of FIG. 1, its the same as FIG. 2 except the wheel, buckets, and other parts have been left off for clarity.

FIG. 5 is a cross sectional view along line 5—5 of FIG. 1.

FIG. 6 is a view of a link plate with holes drilled in it for mounting a bar in-between its ends.

FIG. 7 is a diagrammatic view of a chain comprised of a belt with additional splices mounted between the bars. Link plates have been omitted for clarity and to show that the chain could be constructed without link plates.

FIG. 8 is a cross sectional view along line 8—8 of FIG. 7.

FIG. 9 is a diagrammatic view of a chain comprised of overlapping ropes with additional splices other than the bars. Link plates have been omitted for clarity and to show that the chain could be constructed without link plates.

FIG. 10 is a cross sectional view along line 10—10 of FIG. 9.

FIG. 11 is a cross sectional view through the bars showing how a protective coating can surround the link plates as they pass through the bars. The ropes and other parts have been omitted for clarity.

FIG. 12 is a view of the surface of a bar that contacts the drive or idler wheels. It has grooves cut in it for additional traction.

FIG. 13 is a cross sectional view along line 13—13 of FIG. 12.

DRAWING REFERENCE NUMERALS 1 wheel
3 link plate
5 bar
7 bar screws
9 bottom bar
11 rope
13 external bucket plate
15 bucket screws
17 bucket
19 guide
21 belt
23 belt splice
25 rope clamp
27 bar grooves
29 protective cover

DESCRIPTION OF THE INVENTION

Referring to FIGS. 1, 2 and 3 the chain is comprised of a plural series of link plates 3 located side by side. Link plates are comprised of materials that have a modulus of elasticity (E) greater than 1,000,000 pounds per square inch. They can be made of composite materials that have an aggregate E greater than 1,000,000 pounds per square inch. Link plates are also square or rectangular in cross section. The edges of link plates can have rounded edges and corners if desirable. The ends of adjoining link plates 3 are overlapped and held in position by clamping them in-between a pair of top bars 5 and a bottom bar 9 The clamping force is provided by bar screws 7 which mount in holes match drilled in the link plates 3 and bars 5 and 9. These screws are countersunk in bars 5 and 9 to prevent them from damaging the wheels 1.

Referring to FIGS. 1 and 2, ropes 11 comprised of any material including wire are passed through the buckets the entire length of the chain. Ropes 11 are also passed through the bars 5 and 9. Ropes are also passed through the guides 19. The ropes 11 are added to prevent the bucket chain from breaking in half should the link plates 3, bars 5 and 9, or the bar screws 7 fail. There are two top bars 5 instead of one because this allows partial disassembly of the chain to work on one of the series of link plates or to remove a rope from in-between the bars 5 and 9 without breaking the chain in half as would be the case if bar 5 was comprised of one part.

Referring to FIGS. 9 and 10 the ropes of FIGS. 1 and 2 can be placed side by side when clamped together with the bars 5 and 9 to form and endless loop. Additional rope clamps 25 are used to assure that they do not pull apart. The insides of the bars 5 and 9 are shaped to accept the shape of the rope 11.

Referring to FIGS. 1 and 2, buckets 17 are attached to the ends of bars 5 and 9 by bucket screws 15 which protrude through holes drilled in bucket 17, and external bucket plate 13. External buckets plate 13 is used to distribute the compressive stresses created by the clamping force of the bucket screws 15 upon the shell of bucket 17. The sides of the bucket 17 and/or the external plate 13 can be used to guide the chain together with or without the use of additional guides. The external 13 bucket plates can be used to mount other accessories. Guides 19 are positioned adjacent to the sides of wheel 1 in order to prevent the chain from coming off of the wheel. Wheel 1 supports the guides the chain as it circulates about and conveys material.

The distance that the bars 5 and 9 are spaced along the chain are important because of chordal action dynamics. Chordal action is the rise and fall of the chain as it goes around a wheel 1. It is caused by the protrusion of the bars 5 and 9 which makes the mating surface between the wheel 1 and the bars 5 and 9 of the chain discontinuous and uneven resulting in a bumpy and jerky engagement. Chordal action is directly related to the spacing of bars 5 and 9 along the length of the chain. It has been found that if the bars are spaced less than 5 inches apart along the chain that chordal action can be controlled to within acceptable limits with less stress on the leaf plates, ropes, or other elements of the conveyor chain. Referring to FIGS. 1, 3, and 6 additional bars 5 and 9 can be spaced closer together without increasing the number of link plates by drilling additional holes in the link plates in-between the two ends and adding additional bars 5 and 9 accordingly. Referring to FIGS. 1 and 4, and alternate way of mounting bars 5 and 9 can be accomplished by positioning the bar screws 7 laterally to the side of link plates 3 so that additional bars 5 and 9 can be added without passing the bar screws 7 through the link plates 3, this makes infinite adjustment of the spacing between adjacent sets of bars 5 and 9 possible.

Referring to FIGS. 4 and 10, the inside surfaces of bars 5 and 9 can be shaped to match the shape of the ropes 11 or the link plates 3. Referring to FIG. 5 the bars 5 and 9 have a curved surface at the corners where the ropes or link plates protrude from the bars 5 and 9. This reduces stresses that would cause the rope 11 or link plates 3 from being damaged as they bend around the wheel 1.

Referring to FIGS. 6 and 11 a protective covering 29 made of a flexible material such as rubber, paint, or plastic can be attached to the exposed surfaces (topes, bottoms, and edges) of link plates 3 in the areas where link plates are not in contact with bars 5. Referring to FIG. 11, the protective covering 29 can also be applied to the link plates 3 where it passes through the bars 5 and 9 and is sandwiched between the two bars 5 and 9 when they are clamped together by the bars crews 7. The protective cover 29 can also be applied to the surfaces of bars 5 and 9 to totally encapsulate the chain.

Referring to FIGS. 1 and 2, the ends of bars 5 and 9 extend out past the edges of link plates 3 and cables 11 to provide a standoff for mounting buckets 17 or external bucket plates 13. This prevents the buckets 17 or external bucket plates 13 from contacting the edges of link plates 3 and rope 11.

Referring to FIGS. 7 and 8 the ropes 11 of FIGS. 1 and 2 could be replaced with belts 21 made of natural or synthetic fibers or elastomers. All of the improvements above pertaining to ropes pertain also to belts. The belts are overlapped and clamped between the bars 5 and 9. Additional belt clamps 23 are added as required between the bars 5 and 9 to assure that they do not pull apart. Where the belts 21 pass through the buckets they can be clamped by conventional belt clamps anywhere along their lengths.

Referring to FIGS. 12 and 13 grooves are cut in the bars 5 and 9 on the surface that comes in contact with wheels 1. This increases friction and reduces slippage as the conveyor chain goes around its wheels.

OPERATION OF THE INVENTION

Referring to FIG. 2, wheel 1 is turned by a suitable power source. Friction between the wheel 1 and the bars 5 and 9 provides a tractive force to propel the chain. As the chain circulates around the wheel 1, the link plates 3 bend allowing the chain to go around the wheel 1. The link plates 3 are ideally suited to repeated bending in the area where they protrude from the bars 5 and 9 without kinking, cutting, graying, etc. as do ropes and belts. The link plates 3 are the primary members carrying the load and stress imparted to the conveyor chain. The ropes and belts are added as secondary members to serve as a safety to prevent the chain from breaking in half should the link plates 3, bars 5 and 9, bar screws 7, etc. fail. The ropes 11 that run through the buckets 17 pass loosely through holes drilled in the buckets and will keep the chain on path should it break in half. The ropes 11 that run through the guides 19 pass loosely through holes drilled in the guides 19 and will keep the chain on path should it break in half. Passing the ropes 11 loosely through the buckets 17 and guides 19 prevent bending stresses in the rope that would cause it to wear out quickly.

Referring to FIGS. 1 and 2, ropes 11 are also passed through the bars 5 and 9. While ropes are good tension elements they tend to wear out prematurely when bent around discontinuous members such as the edges of the bars 5 and 9. This amount of wear is a function of the load they are under when bent. Therefore in order to prevent wear a small slack in introduced into the ropes 11 at assembly so their length between adjacent pairs of bars 5 and 9 is longer than the corresponding link plates 3. The ropes 11 should also be made long enough so that when the conveyor chain goes around the wheel 1 the ropes 11 do not take any significant part of the load. Therefore the link plates of the chain 3 take the load and the ropes 11 are only slightly stressed as they go around the wheel in a standby mode thereby greatly increasing their life. Another advantage of making the ropes longer than the link plates 3 is that should they 11 take the load due to damage of the link plates 3 the chain will run less smooth due to the increase in spacing of the bars and the resulting increased chordal action, this change in smooth action can be monitored and used to warn of damage to the link plates 3.

Referring to FIGS. 1 and 2, driving the bar 5 into two parts makes maintenance on the topes 11 and the link plates 3 easier since a damaged element can be replaced with less disassembly.

Should the link plates 3 fail and the topes 11 take the load or if a short lived chain is required where the link plates 3 are not used the life of the ropes 11 can be increased by spacing the bars 5 and 9 in close proximity along the length of the ropes. This reduces the amount of bending across the corners of bars 5 and 9. Bending can be further reduced by curving the edges as shown in FIG. 5.

RAMIFICATIONS AND SCOPE

Although the description above contains many specificities, these should not be construed as limiting the scope of the invention but as merely providing illustrations of some of the presently preferred embodiments of this invention. For example:

Every now and then a set of bats 5 and 9 could be left off down the length of the conveyor chain. This extra spacing would cause a bump every now and then as the chain circulates about the wheels. A bump every now and then may not cause detrimental effects.

Other appendages could be added to the bars 5 and 9 to perform a variety of functions such as plowing, sweeping, etc.

A variety of different types of clamps could be used to mount to the bars 5 and/or 9 to hold the ropes, belts, and link plates.

The ropes, belts, could be made up in short segments to facilitate replacing specific damaged areas.

The inside of the bars 5 and 9 can be shaped to match the tension elements held.

The position of the ropes, belts, and link plates could be staggered in their side by side orientation.

Both the top and bottom bars 5 and 9 could be several pieces and overlapped together to aid in chain assembly and repair.

The curved surface adjacent to the ropes and belts in the bars 5 and 9 as shown in FIG. 5 could be formed as a surface of revolution.

The belts and ropes can be replaced with other axial tension members such as roller or hoisting chains.

Belts, ropes, and chains can be short sections starting and ending at each bar 5 and 9 or they can span across several bars before being attached.

Auxiliary splicing means can be used to splice the belts, ropes, and chains, in addition to the bars 5 and 9.

The link plates can be overlapped.

Other appendages could be added to the bars to attach axial tension elements.

Different groove patterns can be cut in the bars or wheels for enhanced traction.

Thus the scope of the invention should be determined by the appended claims and their legal equivalents, rather than by the examples given.

I claim:

1. An improved conveyor chain for mounting upon a plurality of wheels comprising:

a primary tension member, wherein said primary tension member is comprised of a series of plates, each of said plates having two ends, the end of said plates adjoining one another to form an endless band, means for joining said ends together;

a series of bars, wherein said series of bars span laterally across said endless band, and spaced at intervals down the length of said endless band, means to clamp said series of bars to said endless band, said improvement comprising:

a secondary tension member being located adjacent to said plates, said secondary tension member running parallel to said conveyor chain plates, said secondary tension member being comprised of wire rope, means for attaching said secondary tension member to said series of bars, wherein said secondary tension member serves as a safety backup should said plated break.

* * * * *